Aug. 11, 1925.
Re. 16,136
M. K. HOPKINS
FUSIBLE LINK
Original Filed April 23, 1919
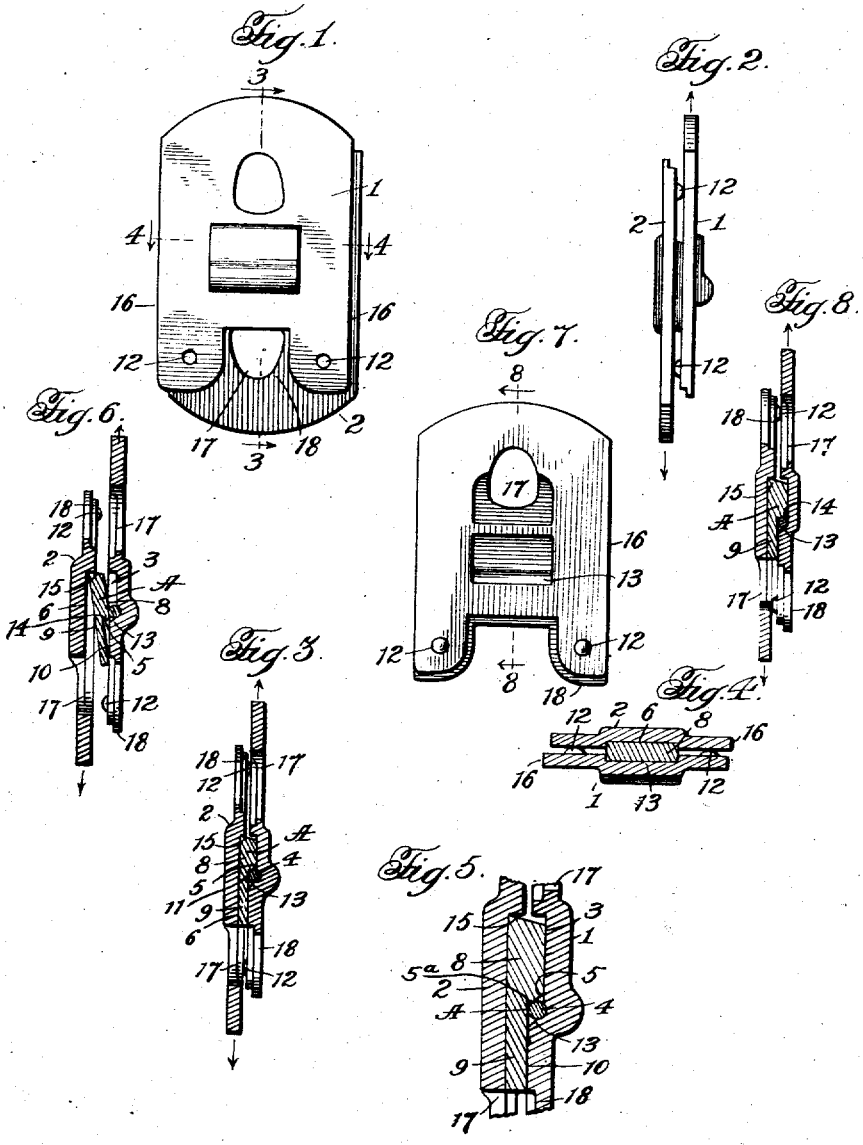
Witness:
Jas. E. Hutchinson.
Inventor:
Morton K. Hopkins,
By Milans & Milans
Attorneys Reissued Aug. 11, 1925.

Re. 16,136

UNITED STATES PATENT OFFICE.

MORTON K. HOPKINS, OF CHICAGO, ILLINOIS, ASSIGNOR TO JOHN L. KENNEDY, OF CHICAGO, ILLINOIS.

FUSIBLE LINK.

Original No. 1,356,919, dated October 26, 1920, Serial No. 292,142, filed April 23, 1919. Application for reissue filed October 26, 1922. Serial No. 597,184.

*To all whom it may concern:*

Be it known that I, MORTON K. HOPKINS, a citizen of the United States, residing at Chicago, in the county of Cook and State of Illinois, have invented certain new and useful Improvements in Fusible Links, of which the following is a description.

My invention belongs to that general class of devices known as fusible links, which under normal conditions are adapted to securely connect cooperating parts or mechanisms, but under abnormal conditions will release to allow the parts to separate. Such devices are used for many purposes, but are particularly desirable and very generally used in connection with automatic sprinkler heads, and my improved link is peculiarly adapted for that use, but obviously may be used wherever found desirable.

The invention has among its objects the production of a device of the kind described that is simple and economical in construction, and thoroughly efficient and satisfactory in use.

To this end, my invention consists in the novel construction, arrangement and combination of parts herein shown and described, and more particularly pointed out in the claims.

In the drawings, wherein like reference characters indicate like or corresponding parts, Figure 1 is a face view of my improved link assembled;

Figure 2 is an edge view of the same before the solder is applied;

Fig. 3 is a sectional view on line 3—3 of Fig. 1;

Fig. 4 is a transverse sectional view on line 4—4 of Fig. 1;

Fig. 5 is a sectional view similar to Fig. 3, enlarged to more clearly show the operating portion of the device;

Fig. 6 is a vertical central sectional view, illustrating the operation as the parts are separated;

Fig. 7 is an inside face view illustrating a slight modification; and

Fig. 8 is a central vertical section on line 8—8 of Fig. 7 when the latter and associated parts are assembled.

Referring to the several drawings, 1—2 are cooperating mating plates adapted to be placed face to face with the connecting loops extending in opposite directions. One of the plates, as 1, has a pocket or recess 3 formed therein, which at one end, as shown in Figs. 1 to 6, is slightly depressed to receive an anti-friction roller 4 extending transversely the same. The approximate wall of the pocket or depression is preferably beveled or inclined as at 13. The opposite plate has a cooperating recess 6 formed therein substantially registering with the recess 3, the two providing for the reception of a key member, generally indicated by the reference character A. The key has a thickened portion as at 8, substantially to the extent that it will loosely fill the cell formed between the two plates at that point. An extending thinned portion 9 extends over the anti-friction roller 4, and lies upon the inner wall of the plate as at 10. A shoulder 11 formed between the thickened portion and the thin or extending tongue 9 of the key A, rests back of the anti-friction roller 4, as clearly shown in Figs. 3 and 5, and is preferably provided with an outwardly beveled or inclined part 5, connecting with the relatively straight narrow shoulder portion $5^a$. In the form of plate shown, the two plates are stamped from suitable metal, the formation of the recess or cell 3 being indicated on the opposite side of the plate 1. Suitable studs 12 are preferably provided upon the meeting faces of the plates so as to slightly space the two and permit the even distribution of the solder therebetween. When the parts are assembled and in use, the pull is in the direction indicated by the arrows in Figs. 2, 3, 6 and 8.

In assembling the plates, the anti-friction roller 4 is dropped into position, and the key A placed thereon, with the shoulder 11 back of the roller, the roller and key loosely but somewhat snugly fitting the cell or pocket thus formed. The other plate is then placed in position and the whole secured together by a suitable quality of solder.

It will be seen that with the pull in the direction indicated by the arrows, the loosening of the solder will cause the shoulder 11 to ride over the anti-friction roller 4, the front end 9 of the key bearing upon the face of one plate, while the rear wall of the other plate engages the corner of the key, as clearly shown in Fig. 6. This action causes the forcible and instantaneous separation of the two plates.

In the form shown in Figs. 7 and 8, the same construction is found, with the exception that the anti-friction roller 4 is not seated in a depression in the cell. The rear wall of the cell, as at 13, is inclined as before to provide but a slight retaining corner, and the face of the key as at 14 is also beveled or inclined, the two being so constructed as to provide positive engagement between the parts, though slight. Upon the solder releasing, the rear wall of the cell in the plate 2 will engage the corner 15 of the key, serving to slightly lift the same, when the inclined face on the key will ride over the roller and the key will slip over the wall, the front extension 9 operating in the same manner as is shown in Fig. 6. The action of the roller is slightly less restricted in the latter form than in the former.

One of the difficulties of a fusible link used for this purpose is caused by corroding between the meeting edges of the plate about the margin. Also in some cases calcimine gathers upon the plates and interferes with their proper action. To guard against the objections above noted, I prefer to offset the plates in relation to each other to provide an extending margin, as clearly shown in Figs. 4 and 7. The width of this extending margin may be varied as desired, but it preferably extends clear about the outer edges of the links, as well as at all exposed points, as at the opening 17 and the cooperating indentation 18. This may be readily accomplished by slightly offsetting one plate with relation to the other, as indicated in the several figures.

The entire device as thus described possesses the necessary positive engagement of the parts to reliably sustain the strain in the pulling direction under all normal conditions, and at the same time, when the solder softens sufficiently to release the parts, they are quickly and reliably disengaged to permit the separation of the connected parts held together by the link.

It will be appreciated that by reason of the inclined surfaces on the key and the wall surrounding the recess, the cooperating engaging surfaces are slight, but amply sufficient to take the strain off of the solder, but upon the solder melting, which allows the plates to separate slightly, the inclined faces in cooperation with the roller tend to cause the plates to quickly separate. Should the roller not release as quickly as the rest of the device as by some solder getting under the roller, the key nevertheless would quickly move outwardly by reason of the engagement of the inclined face with the roller. In other words, while upon the assembling of the parts together with suitable solder, they will be promptly retained in position, upon the melting of the solder, the longitudinal movement of the cooperating plates one upon the other, will disengage the key and the engagement of the inclined faces with the roller will accelerate the separation of the plates.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

I claim—

1. In a fusible link and in combination, cooperating mating parts adapted to be placed face to face and constructed to provide a key way between them, an anti-friction device transversely positioned in the key way adjacent to one wall thereof, and a cooperating key adapted to be placed in the key way with a part extending back of and in contact with the anti-friction device, with an extension passing over the anti-friction device and resting upon the wall of the plate beyond the same, whereby upon assembling the parts together with suitable solder, they will be firmly retained in position, but upon melting the solder, they will be quickly and positively disengaged.

2. A fusible link comprising cooperating mating plates adapted to be placed face to face and constructed to provide a key way between them, an antifriction roller transversely positioned in the key way adjacent to one wall thereof, in combination with a cooperating key adapted to be placed in the key way with a part extending back of and in contact with the anti-friction device, with an extension passing over the same and resting upon the wall of the plate beyond it, the contacting wall of the cell with the anti-friction device and of the shoulder of the key contacting therewith being inclined to facilitate the riding of the key over the anti-friction device.

3. In a fusible link and in combination, cooperating mating parts adapted to be placed face to face and constructed to provide a key way between them, said key way near one wall thereof being depressed transversely to receive an anti-friction roller, an anti-friction roller adapted to be placed in said depression, a cooperating key adapted to be placed in the key way, provided with a part extending back of and in contact with the anti-friction roller, with an extension passing over the anti-friction roller and resting upon the wall of the plate beyond the same, said key being provided at its meeting point with the anti-friction roller with an inclined face, facilitating the ready riding of the key over the roller.

4. In a device of the kind described and in combination, cooperating mating parts adapted to be placed face to face and constructed to provide a key way between them, the key way being so positioned that when the parts are assembled said plates will be offset slightly in relation to one another, permitting the edges to project beyond one another to provide a solder channel, anti-friction means arranged transversely within the key way adjacent to one wall thereof, a cooperating key adapted to be placed in the key way with a part extending back of and in contact with the anti-friction means, with an extension passing over the anti-friction means and resting upon the wall of the plate beyond the same, the contacting wall of the key way with the anti-friction means being inclined to facilitate the ready riding of the key over the anti-friction means.

5. A fusible link construction comprising cooperating members adapted when released to move relatively lengthwise, said members each being provided with a key receiving portion opening inwardly from the inner face thereof and which when the members are assembled forms a key way, in combination with a key formed to fit within the key way, one of said parts being provided with an inclined face portion, and said key having a part projecting over the inner face of one of the members beyond the key-receiving portion.

6. A fusible link construction comprising cooperating members adapted when released to move relatively lengthwise, said members each being provided with a key receiving portion opening inwardly from the inner face thereof and which when the members are assembled form a key way, in combination with a key formed to fit within the key way, said key and one of said key receiving portions having inclined faces, and said key having a part projecting over the inner face of one of the members beyond the key-receiving portion.

7. A fusible link construction comprising cooperating members adapted when released to move relatively lengthwise, said members each being provided with a key receiving portion opening inwardly from the inner face thereof and which when the members are assembled forms a key way, in combination with a key formed to fit within the key way and provided with a part to extend beyond the key receiving portion in one of the members over the inner face thereof, the wall of the key receiving portion of one of the members having an inclined face portion.

8. A fusible link construction comprising cooperating members adapted when released to move relatively lengthwise, said members each being provided with a key receiving portion opening inwardly from the inner face thereof and when the members are assembled forming a key way, in combination with a cooperating key formed to fit within the key way and provided with a part to extend beyond the key receiving portion in one of the members over the inner face thereof, said key member having an inclined face portion, and the wall of the recess of one of the members having an inclined face portion.

9. A fusible link construction comprising cooperating members adapted when released to move relatively lengthwise, said members each being provided with a key receiving portion opening inwardly from the inner face thereof and when the members are assembled forms a key way, in combination with a cooperating key formed to fit within the key way and provided with a part to extend beyond the key receiving portion in one of the members over the inner face thereof, said key member having inclined face portions at both ends, and the wall of the recess of one of the members having an inclined face portion.

10. A fusible link construction comprising cooperating members adapted when released to move relatively lengthwise, said members each being provided with a key receiving portion opening inwardly from the inner face thereof and which when the members are assembled forms a key way, the key receiving portions of the members being relatively shallow and of substantially equal depth, in combination with a cooperating key formed to fit within the key way and provided with a part to extend beyond the key receiving portion in one of the members over the inner face of said member, the key intermediate its ends having an inclined portion and the adjacent portion of the key opening having a cooperating inclined portion.

11. A fusible link construction comprising cooperating members adapted when released to move relatively lengthwise, said members each being provided with a key receiving portion opening inwardly from the inner face thereof and which when the members are assembled forms a key way, in combination with a cooperating key formed to fit within the key way and provided with a part to extend beyond the key receiving portion in one of the members over the inner face thereof, said key member having an inclined face portion.

12. A fusible link construction comprising cooperating members adapted when released to move relatively lengthwise, said members each being provided with a key receiving portion opening inwardly from the inner face thereof and which when the members are assembled forms a key way, in combination with a co-operating key formed to fit within the key way and provided with a part to extend beyond the key receiving portion in one of the members over the inner face thereof, said key member having inclined face portions at both ends.

13. In a fusible link and in combination, cooperating mating plates adapted to be placed face to face and constructed with a key way between them, said key way being of smaller area in one of said plates than in the other, and a cooperating key conforming to the key way with the section extending into the smaller area forming a shoulder with an inclined face and a slight retaining wall, the approximate wall of the key way being also formed with an inclined face and retaining wall to facilitate the releasing of the key from the key way.

14. In a fusible link and in combination, cooperating plates adapted to be placed face to face and constructed with a key way between them, said key way being of smaller area in one of said plates than the other, and a cooperating key conforming to the key way with the section extending into the smaller area forming a shoulder with an inclined part and a vertical part, the approximate wall of the key way formed with a cooperating inclined part and vertical part, whereby is provided a positive normal connection and on slight movement, a quick release.

15. A device of the kind described comprising mating plates each provided with a recess which when the parts are assembled forms a keyway, in combination with a cooperating key formed to loosely fit within the keyway and provided with a part to extend beyond the recess in one of the plates over the face of the plate.

16. A fusible link comprising cooperating members adapted when released to move relatively lengthwise, said members each being provided with a key-receiving portion opening inwardly from the inner face of said members and which when the members are assembled forms a keyway, in combination with a cooperating key formed to loosely fit within the keyway and provided with a part to extend beyond the key-receiving portion in one of the members over the inner face of said member.

17. A fusible link comprising opposed members, the said members each having a recessed part which when brought into registration provides a keyway, in combination with a cooperating key formed to loosely fit within the keyway and provided with a part to extend beyond the recess in one member over the inner surface of said last named member.

18. A fusible link comprising two mating plates each provided with means on one end to engage a co-operating part, the said engaging ends extending in opposite directions when the parts are assembled, the said plates each having formed therein a depression which when the parts are assembled forms a keyway, one of said depressions being of larger area than the other, the smaller depression being provided on an end wall with an angular part and an inclined part extending from said angular part to the face of the plate, in combination with a key, on one side formed to loosely seat in the smaller depression, and provided with an angular part and inclined edge portion, said last named side of the key having a part thereof lying on the face of the corresponding plate.

19. A device of the kind described comprising mating plates each provided with means on one end to engage a cooperating part, said engaging ends extending in opposite directions when the parts are assembled, the said plates each having formed therein a depression which when the parts are assembled forms a substantially L-shaped keyway, the smaller part of the keyway being provided on its end wall with a part extending substantially at right angles to the face of the plate a limited distance, and with an inclined section extending therefrom to the face of the plate, in combination with an L-shaped key formed to loosely seat in the keyway, the arm of the key forming a right-angular extension, said right-angular extension having an inclined edge portion.

In testimony whereof I hereunto affix my signature in the presence of two witnesses.

MORTON K. HOPKINS.

Witnesses:

CHAS. J. MAXCY,
THEO. S. VALENTINE.